United States Patent
Ujino et al.

(10) Patent No.: US 10,376,831 B2
(45) Date of Patent: Aug. 13, 2019

(54) SOLVENT SEPARATION METHOD AND SOLVENT SEPARATION APPARATUS

(71) Applicant: Panasonic Corporation, Osaka (JP)

(72) Inventors: Tomohiro Ujino, Osaka (JP); Koichi Nagai, Kyoto (JP); Naofumi Hino, Osaka (JP)

(73) Assignee: Panasonic Corporation, Osaka (JP)

( * ) Notice: Subject to any disclaimer, the term of this patent is extended or adjusted under 35 U.S.C. 154(b) by 353 days.

(21) Appl. No.: 15/465,587

(22) Filed: Mar. 21, 2017

(65) Prior Publication Data

US 2017/0348637 A1 Dec. 7, 2017

(30) Foreign Application Priority Data

Jun. 2, 2016 (JP) ................. 2016-111208

(51) Int. Cl.
*B01D 53/32* (2006.01)
*B03C 3/02* (2006.01)
*B03C 3/38* (2006.01)
*B03C 3/68* (2006.01)
(Continued)

(52) U.S. Cl.
CPC .............. *B01D 53/323* (2013.01); *B03C 3/02* (2013.01); *B03C 3/38* (2013.01); *B03C 3/66* (2013.01); *B03C 3/68* (2013.01); *B03C 9/00* (2013.01); *B01D 2257/704* (2013.01); *B01D 2258/02* (2013.01); *B01D 2259/818* (2013.01)

(58) Field of Classification Search
CPC combination set(s) only.
See application file for complete search history.

(56) References Cited

U.S. PATENT DOCUMENTS 3,154,682 A * 10/1964 Hartz ................. C01B 23/0005
                                                                                                       95/78
4,543,484 A * 9/1985 Meyerand, Jr. ......... H01J 27/24
                                                                                                     250/423 P
(Continued)

FOREIGN PATENT DOCUMENTS

JP      57-110350 A     7/1982
JP      7-275641 A     10/1995
(Continued)

*Primary Examiner* — Christopher P Jones
*Assistant Examiner* — Sonji Turner
(74) *Attorney, Agent, or Firm* — Panasonic IP Management; Kerry S. Culpepper

(57) ABSTRACT

Provided is a solvent separation method and a solvent separation apparatus in which a vaporized solvent is collected at one internal side of a solvent separation unit by attracting the vaporized solvent based on electric field, while the vaporized solvent is prevented from coming into contact with electrodes, and the collected solvent is discharged from the solvent separation unit. Different electric fields are alternately applied to a pair of first electrodes and a pair of second electrodes present at predetermined locations inside a tetragonal tubular solvent separation unit to attract a vaporized solvent toward the second electrodes. Thus, the vaporized solvent is collected in a space between the second electrodes inside the solvent separation unit, and the collected solvent is discharged from the solvent separation unit, together with a portion of the exhaust atmosphere present around the collected solvent.

3 Claims, 9 Drawing Sheets

(51) Int. Cl.
*B03C 3/66* (2006.01)
*B03C 9/00* (2006.01)

(56) References Cited

U.S. PATENT DOCUMENTS

| | | | | |
|---|---|---|---|---|
| 5,012,159 | A | * | 4/1991 | Torok .................. B03C 3/38 250/324 |
| 5,476,539 | A | * | 12/1995 | Suzuki .................. B01D 53/32 96/44 |
| 6,761,752 | B2 | * | 7/2004 | Fissan .................. B03C 3/06 95/74 |
| 9,731,299 | B2 | * | 8/2017 | Segawa .................. B03C 3/017 |
| 2004/0007134 | A1 | | 1/2004 | Parsa |
| 2006/0070951 | A1 | | 4/2006 | Baba et al. |
| 2015/0122123 | A1 | * | 5/2015 | Segawa .................. B03C 3/017 95/73 |
| 2015/0248989 | A1 | | 9/2015 | Ezaki et al. |
| 2015/0279647 | A1 | | 10/2015 | Baba |

FOREIGN PATENT DOCUMENTS

| | | |
|---|---|---|
| JP | 11-028330 A | 2/1999 |
| JP | 2007-038129 A | 2/2007 |
| JP | 2015-053253 | 3/2015 |
| JP | 2015-142898 | 8/2015 |
| JP | 2015-537335 | 12/2015 |
| WO | 2004/050220 | 6/2004 |

\* cited by examiner

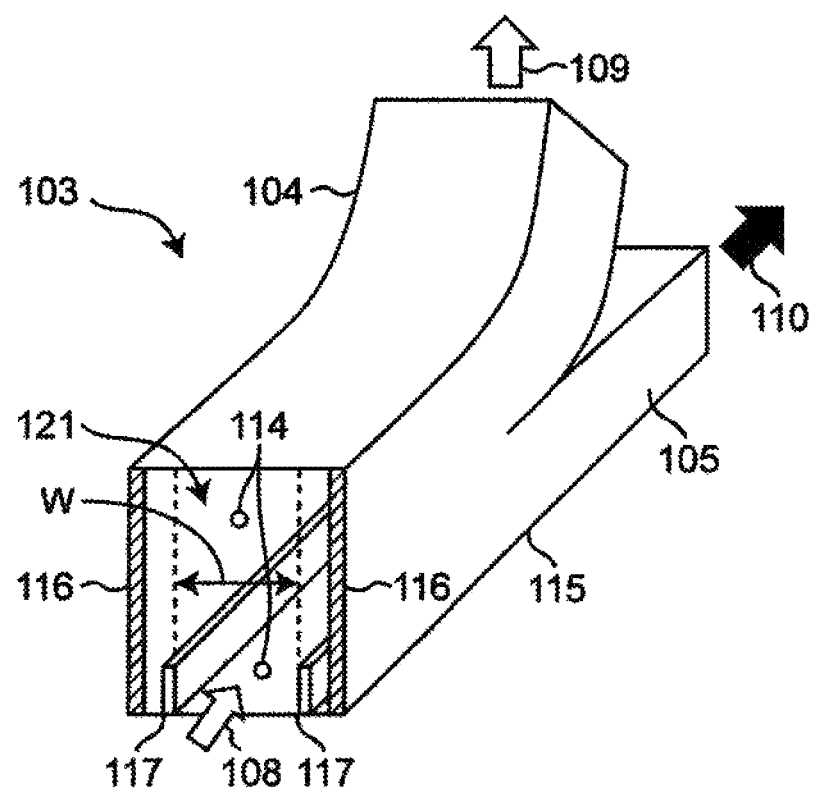

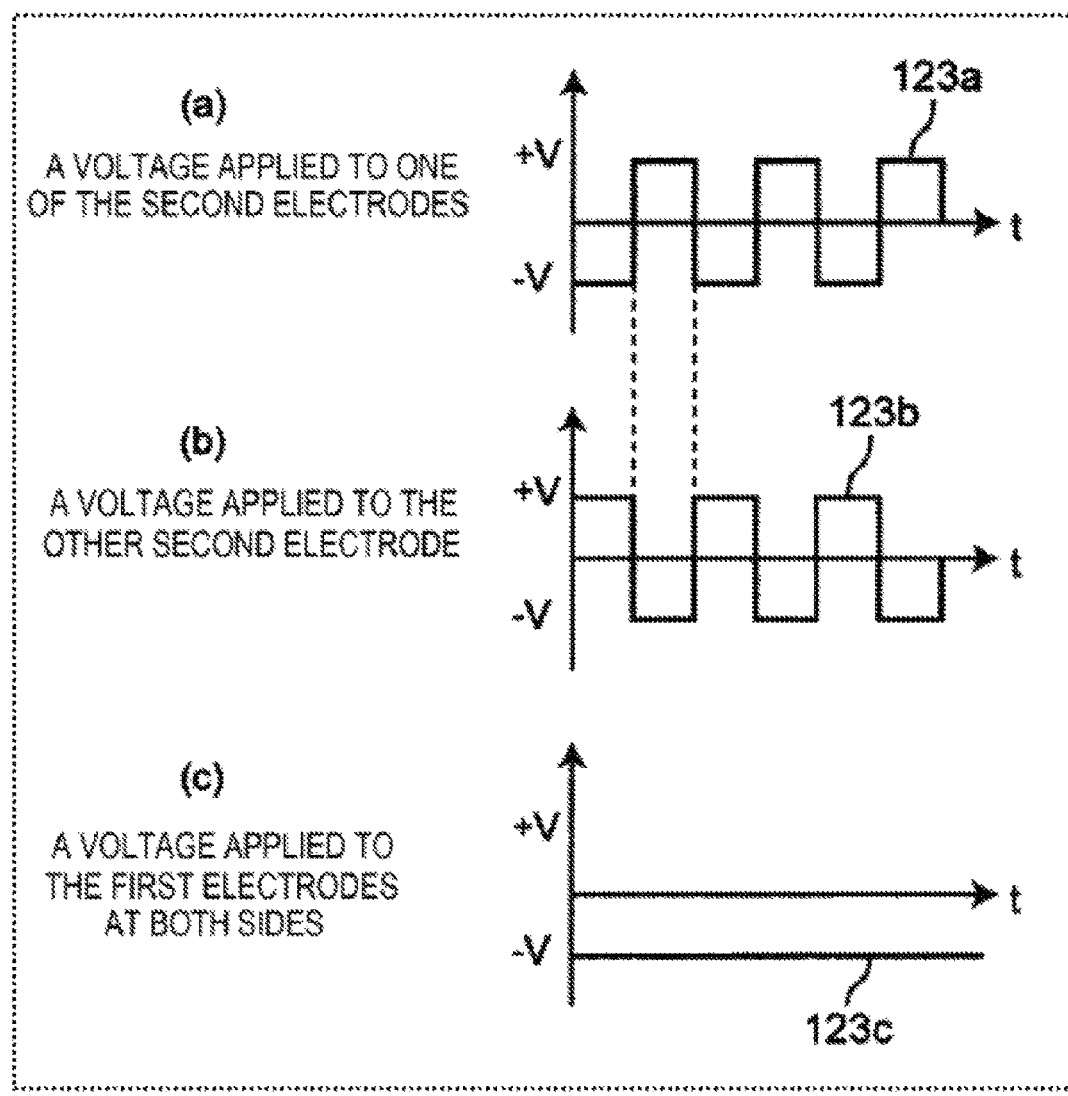

(a) A VOLTAGE APPLIED TO ONE OF THE SECOND ELECTRODES (b) A VOLTAGE APPLIED TO THE FIRST ELECTRODE PRESENT AT THE SIDE WHERE THE SECOND ELECTRODE APPLIED WITH THE VOLTAGE 123a IS PRESENT (c) A VOLTAGE APPLIED TO THE OTHER SECOND ELECTRODE (d) A VOLTAGE APPLIED TO THE FIRST ELECTRODE PRESENT AT THE SIDE WHERE THE SECOND PRESENT APPLIED WITH THE VOLTAGE 123b IS PRESENT

PRIOR ART

SOLVENT SEPARATION METHOD AND SOLVENT SEPARATION APPARATUS

TECHNICAL FIELD

The technical field relates to a solvent separation method and a solvent separation apparatus in which, from a gas including a vaporized solvent, the vaporized solvent is separated, and thus, the gas is purified.

BACKGROUND

In recent years, in processes for assembling and producing various industrial products and home electronics, and processes for producing various devices (e.g., electronic components, batteries and substrates) that can be components included in such industrial products and home electronics, paste materials that have various functions are coated onto the products or devices, and then, the products or devices are subjected to heat treatments by use of various heat treatment apparatuses. For example, the heat treatment apparatuses include drying furnaces, baking furnaces, cure furnaces, and reflow furnaces. Reflow furnaces are used for, for example, soldering in an electronic component-mounting process. Various solvents such as water and organic solvents are mixed into the paste materials, according to their purposes or as needed, in addition to solid contents required in final products, in order to coat the paste materials onto various substrates or base materials, and thus, the viscosities or performance of the paste materials are adjusted.

The solvents included in the paste materials are released from the paste materials inside the heat treatment apparatuses through the vaporization and solvent-removing processes in heating steps carried out in the heat treatment apparatuses. Accordingly, in cases where the heat treatments are continuously carried out, the solvents are vaporized and released from the paste materials inside the apparatuses, and, as a result, the concentrations of the vaporized solvents inside the heat treatment apparatuses are increased. Such increases in the concentrations of the vaporized solvents inside the heat treatment apparatuses possibly cause various problems. For example, with increasing concentrations of the solvents in the atmospheres inside the heat treatment apparatuses, allowable amounts of solvents in the atmospheres at temperatures inside the apparatuses come close to saturation, and thus, it may be difficult to dry the object that is subjected to the heat treatment. Additionally, in cases where explosive solvents are used, the concentrations of the vaporized solvents possibly exceed limits for explosion even if the concentrations do not reach the saturated steam pressures. Therefore, it is required to regularly or continuously supply the outside air into the heat treatment apparatuses from the outside, and also, it may be required to regularly or continuously supply a nitrogen gas or any other atmospheres (atmosphere gases) into the heat treatment apparatuses from the outside, as needed. Furthermore, simultaneously, any means for releasing to the outside the atmospheres that are present inside the heat treatment apparatuses and that include increased concentrations of the solvents may be required.

FIG. 8 is a diagram that depicts supply and discharge of an atmosphere. The outside air is supplied into a heat treatment apparatus 1 with a blower 2. A part of the atmosphere present inside the heat treatment apparatus 1 and including a solvent vaporized in the heat treatment apparatus 1 is discharged to the outside with a blower 3. As an example of a system for removing the vaporized solvent included in an exhaust gas, a system disclosed in JP-A-2015-142898 is known.

FIG. 9 is a schematic diagram that shows a structure of the system disclosed in JP-A-2015-142898. The structure disclosed in JP-A-2015-142898 is as follows. An electrode 6 is provided on a first wall surface 5a in a solvent separation unit 4, and a voltage can be applied to the electrode 6 from a voltage-applying apparatus 7. Furthermore, a second wall surface 5b opposing the first wall surface 5a is insulated from the electrode 6, and is connected to a grounding wire. The outlet side of the solvent separation unit 4 is configured so as to branch into a first exhaust duct 8 and a second exhaust duct 9, and the first exhaust duct 8 is provided so as to extend from the first wall, surface 5a. By adopting such a structure, a difference in potentials is caused between the second wall surface 5b and the first wall surface 5a opposing the second wall surface 5b, and thus, an electric field 10 is formed inside the solvent separation unit 4. Accordingly, a solvent 11 included in an exhaust atmosphere 12 that has been discharged from the heat treatment apparatus 1 and that has been supplied into the solvent separation unit 4 is attracted toward the electrode 6 due to electrostatic attraction when the solvent 11 reaches an effective region of the electric field 10. Thus, a first exhaust atmosphere 13 that includes the solvent 11 collected at the side of the electrode 6 is discharged from the first exhaust duct 8, while a second purified exhaust atmosphere 14 that does not include the solvent 11 is discharged from the second exhaust duct 9.

SUMMARY

However, according to the structure disclosed in JP-A-2015-142898, the electric field is applied in one direction. Consequently, the solvent will come into contact with the electrode, will not be discharged from the solvent separation unit, and thus, will contaminate the electrode. If such contamination of the electrode progresses, then, this results in reductions in solvent-capturing efficiencies. Therefore, periodic maintenance of the electrode will be required.

In consideration of the above problem, as well as other concerns, the present disclosure concerns a solvent separation method and a solvent separation apparatus in which a vaporized solvent is collected at one internal side of a solvent separation unit by attracting the solvent based on electric fields, while the vaporized solvent is prevented from coming into contact with electrodes, and thus, the vaporized solvent is discharged to the outside.

According to one aspect of the disclosure, provided is a method for separating, from a gas including a vaporized solvent, the solvent, the method including conducting steps (a) to (d) in a solvent separation apparatus, the solvent separation apparatus including (i) a tetragonal tubular casing, (ii) a pair of first electrodes that are insulated from the casing and that are placed so as to entirely cover surfaces of a pair of inner wall opposing each other inside the casing, and (iii) a pair of second electrodes that are insulated from the casing and the first electrodes, that are placed inside the casing so as to be parallel to the first electrodes and to be displaced inward from the first electrodes, and that each have a height substantially equal to or smaller than half a height of the surfaces of the inner walls, wherein the first electrodes and the second electrodes are placed at locations ensuring that a distance from each of the second electrodes to the first electrode closest to the each of the second electrodes is smaller than a distance from the each of the second electrodes to a centerline of the casing, and that the first electrodes and the second electrodes, respectively, are symmetrical to one another about the center line: (a) charging the solvent included in the gas prior to causing the gas to flow into the casing; (b) applying to one of the second electrodes a voltage having a polarity opposite to the polarity of the solvent, and applying to the first electrodes and the other second electrode a voltage having the same polarity as the polarity of the solvent; (c) switching the polarities of the voltages applied to the second electrodes at regular time intervals to collect the vaporized solvent in a predetermined region inside the casing; and (d) separating a gas substantially including the collected vaporized solvent from a gas not substantially including the vaporized solvent present in a region other than the predetermined region inside the casing, and discharging the separated gas from the casing.

Furthermore, according to another aspect of the disclosure, provided is an apparatus for separating a vaporized solvent from a gas, the apparatus including: (i) a tetragonal tubular casing; (ii) a pair of first electrodes that are insulated from the casing and that are placed so as to entirely cover surfaces of a pair of inner walls opposing each other inside the casing; (iii) a pair of second electrodes that are insulated from the casing and the first electrodes, that are placed inside the casing so as to be parallel to the first electrodes and to be displaced inward from the first electrodes, and that each have a height substantially equal to or smaller than half a height of the surfaces of the inner walls; (iv) an inlet that has a width substantially equal to or smaller than a width of a space between the second electrodes; (v) a charging unit that is provided in a flow channel through which the gas is caused to flow into the casing; (vi) a first exhaust gas flow channel and a second exhaust gas flow channel, wherein the first exhaust gas flow channel and the second exhaust gas flow channel are provided downstream of the casing, and are branched from the casing in a direction vertical to a space between the first electrodes; (vii) a voltage-applying apparatus that applies to one of the second electrodes a voltage having a polarity opposite to the polarity of the solvent, and applies to the first electrodes and the other second electrode a voltage having the same polarity as the polarity of the solvent; and (viii) a control unit that controls the voltage-applying apparatus to switch the polarities of the voltages applied to the second electrodes at regular time intervals, wherein the first electrodes and the second electrodes are placed at positions ensuring that a distance from each of the second electrodes to the first electrode closest to each of the second electrodes is smaller than a distance from the each of the second electrodes to a centerline of the casing, and that the first electrodes and the second electrodes, respectively, are symmetrical to one another about the centerline, and the second electrodes each extend into the second exhaust gas flow channel.

According to the above-described solvent separation method and the solvent separation apparatus, since the solvent is collected in a space between the second electrodes inside the solvent separation unit by alternatively applying the different electric fields to the first and the second electrodes, thereby causing oscillating movement of the solvent, and is discharged from the solvent separation unit through one of the branching exhaust gas flow channels, it becomes possible to separate the solvent from the exhaust atmosphere while preventing the solvent from coming into contact with the electrodes.

BRIEF DESCRIPTION OF THE DRAWINGS

FIG. 3A is a diagram that shows a structure of a solvent separation unit in the first embodiment of the disclosure.

FIG. 3C shows graphs of voltages that are applied to first and second electrodes.

DESCRIPTION OF EMBODIMENTS

Hereinafter, embodiments of the disclosure will be described with reference to the drawings.

First Embodiment

Figure 1:
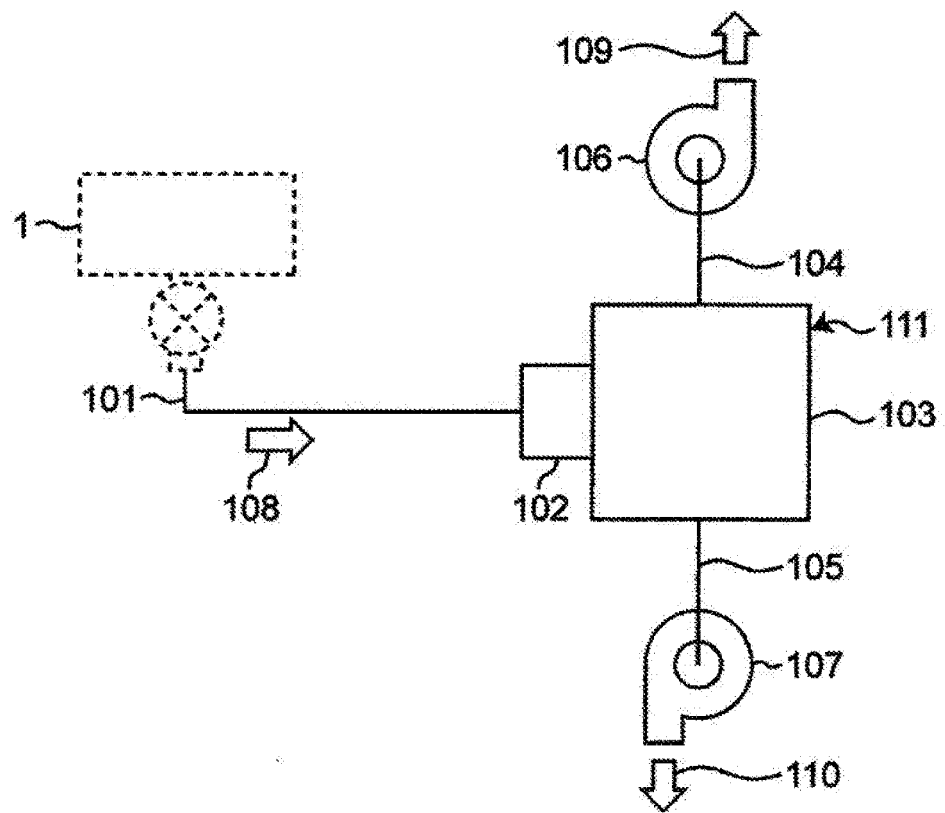
FIG. 1 is a schematic diagram that shows a configuration of a solvent separation apparatus according to a first embodiment of the disclosure.

FIG. 1 is a schematic diagram that shows a configuration of a solvent separation apparatus 111 according to the first embodiment of the disclosure. The solvent separation apparatus 111 is connected to a heat treatment apparatus 1 that is one example of an exhaust gas-generating apparatus. The solvent separation apparatus 111 includes: a charging unit 102; an exhaust duct 101; a solvent separation unit 103; a first exhaust duct 104 that serves as one example of a first exhaust gas flow channel; a second exhaust duct 105 that serves as one example of a second exhaust gas flow channel; a first exhaust blower 106; and a second exhaust blower 107.

The heat treatment apparatus 1 is a furnace (e.g., a sintering furnace, dry furnace, cure furnace and reflow furnace) that carries out a heat treatment. In the heat treatment, various types of materials or elements that are objects to be heated would be heated in suitable manners, and thus, a solvent is volatilized into the atmosphere (gas) inside the heat treatment apparatus 1 through the heat treatment. A part of the atmosphere including the volatilized solvent inside the heat treatment apparatus is led to the first exhaust duct 101 that is placed so as to communicate with the heat treatment apparatus 1.

The solvent separation unit 103 is connected to the downstream side of the exhaust duct 101 via the charging unit 102 so as to communicate with the exhaust duct 101, and the solvent is charged in the charging unit 102 before the solvent flows into the solvent separation unit 103. An exhaust atmosphere 108 is delivered into the solvent separation unit 103 from the heat treatment apparatus 1 through the exhaust duct 101. Thus, as described below in detail, gaseous molecules of the vaporized solvent in the exhaust atmosphere 108 are positively or negatively charged by the charging unit 102, and are separated from gaseous molecules other than the solvent in the exhaust atmosphere 108 due to electrostatic attraction caused by effects of electric fields inside the solvent separation unit 103. As a result, the exhaust atmosphere 108 is separated into a first exhaust atmosphere 109 that corresponds to a portion not including the solvent, and a second exhaust atmosphere 110 that corresponds to a portion including the solvent, and thus, a bias in the concentration of the solvent will be caused in the exhaust atmosphere. In this case, electrostatic attraction means that a positively charged material is attracted by a negative electrical charge, and that a negatively charged material is attracted by a positive electrical charge.

Thus, the first exhaust atmosphere 109 that corresponds to a portion not including the solvent, and the second exhaust atmosphere 110 that corresponds to a portion including the solvent (i.e., the first exhaust atmosphere 109 and the second exhaust atmosphere 110 are separated from one another in the solvent separation unit 103) are led to the first exhaust duct 104 and the second exhaust duct 105, respectively. The first exhaust duct 104 and the second exhaust duct 105 each separately communicate with the solvent separation unit 103. The first exhaust atmosphere 109, which does not include the solvent, is discharged from the solvent separation unit 103 through the first exhaust duct 104 by the first exhaust blower 106. On the other hand, the second exhaust atmosphere 110, which includes the solvent, is discharged from the solvent separation unit 103 through the second exhaust duct 105 by the second exhaust blower 107.

Figure 2:
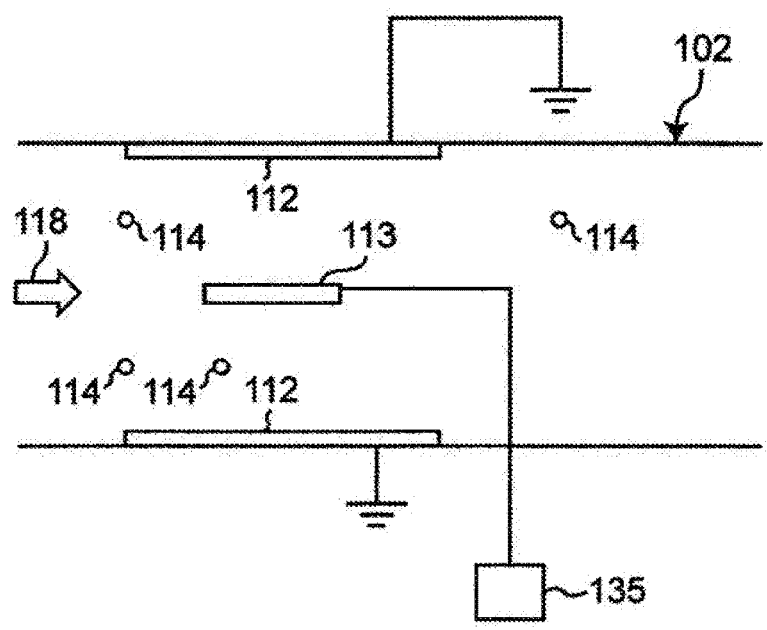
FIG. 2 is a schematic diagram of a charging part.

Now, one example of a structure of the charging unit 102 is shown in FIG. 2. As shown in FIG. 2, the charging unit 102 includes a pair of grounded and opposing flat-plate electrodes 112, and a discharging electrode 113 that is connected to a voltage-applying apparatus 135 used for the charging purpose. The polarity of the discharging electrode 113 is set to be positive or negative based on the voltage-applying apparatus 135, and a high direct-current voltage is applied to the discharging electrode 135. A vaporized solvent 114 that passes through the charging unit 102 is negatively charged when the discharging electrode 113 is a negative electrode, due to corona discharge from the discharging electrode 113 to the flat plate electrode 112. On the other hand, when the discharging electrode 113 is a positive electrode, the vaporized solvent 114 is positively charged. As a result, the vaporized solvent 114 is attracted to a positive or negative electrode due to electrostatic attraction. With regards to other mechanisms for the charging unit 102, the subject may be sprayed with ions so as to be charged, or may be charged based on friction with a wall surface of the charging unit 102.

FIG. 3A is a diagram that shows a structure of the solvent separation unit in the first embodiment of the disclosure. A function of the solvent separation unit 103 to separate the solvent 114 included in the exhaust atmosphere 108 that has been supplied into the solvent separation unit 103, inside the solvent separation unit 103, will now be described.

As shown in FIG. 3A, the solvent separation unit 103 includes: a tetragonal tubular member 115 that serves as one example of a tetragonal tubular casing (tetragonal casing with a tubular structure); a pair of first electrodes 116 that are rectangular and tabular; and a pair of second electrodes 117 that are rectangular and tabular.

The whole body of the tetragonal tubular member 115 may be formed of an insulation material. Alternatively, when the tetragonal tubular member 115 is conductive, the tetragonal tubular member 115 and the first electrodes 116 should be insulated from each other with an insulation material, and the tetragonal tubular member 115 and the second electrodes 117 should also be insulated from each other with an insulation material.

As one example, downstream of the solvent separation unit 103, provided are a first exhaust duct 104 that is located at the upper side, and a second exhaust duct 105 that is located at the lower side. That is, the tetragonal tubular member 115 branches into the first exhaust duct 104 and the second exhaust duct 105 at its downstream side in a direction vertical to the space between the first electrodes 116.

The first electrodes 116 are insulated from the tetragonal tubular member 115, are placed so as to entirely cover a pair of opposing rectangular inner wall surfaces of the tetragonal tubular member 115, and at least extend from the entrance of the solvent separation unit 103 to a branching point of the first exhaust duct 104 and the second exhaust duct 105.

The second electrodes 117 are insulated from the tetragonal tubular member 115 and the first electrodes 116, and are placed inside the tetragonal tubular member 115 so as to be parallel to the first electrodes 116 and to be displaced inward from the first electrodes 116. Furthermore, the second electrodes 117 each have a height substantially equal to or smaller than half a height of the inner-wall surfaces of the tetragonal tubular member 115, and are placed so as to extend into the second exhaust duct 105.

Figure 3B:
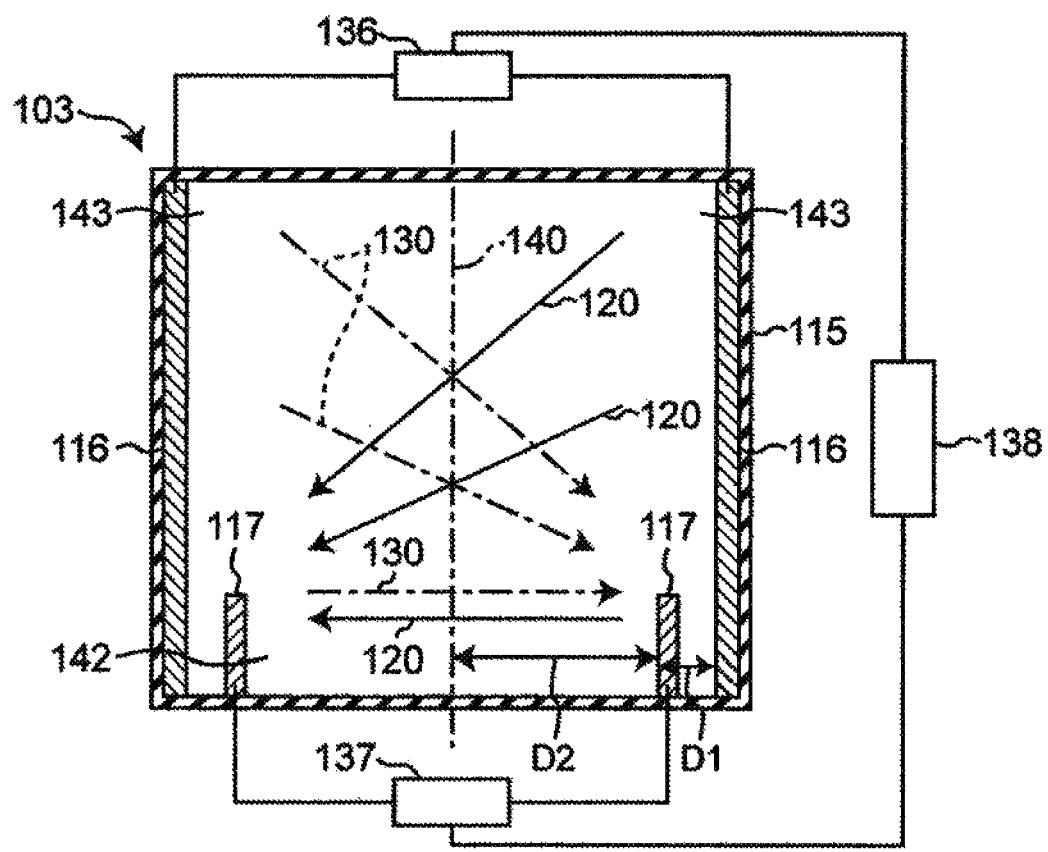
FIG. 3B is a diagram that shows the structure of the solvent separation unit in the first embodiment of the disclosure.

As shown, in FIG. 3B, the first electrodes 116 and the second electrodes 117, respectively, are placed symmetrically to one another about a center line 140 of the tetragonal tubular member 115. That is, the pair of first electrodes 116 and the pair of second electrodes 117 are placed at locations ensuring that a distance D1 from each of the second electrodes 117 to the first electrode 116 closest to the each of the second electrodes 117 is smaller than a distance D2 from the each of the second electrodes 117 to the centerline 140 of the tetragonal tubular member 115, and that the first electrodes 116 and the second electrodes 117, respectively, are symmetrical to one another about the centerline 140. Additionally, the first electrodes 116 and the second electrodes 117 are insulated from the tetragonal tubular member 115 (i.e., the second electrodes 117 may be located or configured so as to be insulated from the tetragonal tubular member 115).

Furthermore, returning to FIG. 3A, a width of an inlet 121 of the solvent separation unit 103 is set to be equal to a width W between a space between the second electrodes 117. The exhaust atmosphere 108 that has been supplied into the solvent separation unit 103 and that includes the solvent 114 is separated into the first atmosphere 109, which does not include the solvent 114, and the second exhaust atmosphere 110, which includes the solvent 114, inside the solvent separation unit 103. Then, the first exhaust atmosphere 109, which does not include the solvent 114, is discharged from the first exhaust duct 104, and the second exhaust atmosphere 110, which includes the solvent 114, is discharged from the solvent separation unit 103 from the second exhaust duct 105.

Hereinafter, voltages that are applied to the electrodes 116 and the electrodes 117 inside the solvent separation unit 103 from a first voltage-applying apparatus 136 and a second voltage-applying apparatus 137, respectively, will be described with reference to an example in which the solvent 114 is negatively charged in the charging unit 102. Application of voltages from the first voltage-applying apparatus 136 and the second voltage-applying apparatus 137 is controlled by a control unit 138. FIG. 3B is a diagram that shows a cross-section of the solvent separation unit 103.

At first, based on control by the control unit 138, a negative voltage is applied to one of the second electrodes 117 (e.g., the right second electrode in FIG. 3B) and a positive voltage with the same absolute value as the negative voltage applied to the one of the second electrodes 117 is applied to the other second electrode 117 (e.g., the left second electrode 117 in FIG. 3B), from the second voltage-applying apparatus 137. Furthermore, a negative voltage with the same absolute value as the voltage applied to the other second electrode 117 is applied to both of the first electrodes 116 from the first voltage-applying apparatus 136. Accordingly, an electric field that attracts the negatively-charged solvent 114 present within a space (region) 142 between the second electrodes 117 toward the second electrode 117 (e.g., the left second electrode 117 In FIG. 3B) that has been applied with the positive voltage is caused inside the solvent separation unit 103 (see arrows 120). Thus, the negatively-charged solvent 114 present within the space (region) 142 is moved toward the second electrode 117 (e.g., the left second electrode 117 in FIG. 3B) that has been applied with the positive voltage, due to electrostatic attraction.

Then, based on control by the control unit 138, only the polarities of the voltages applied to the respective second electrodes 117 are switched by the second voltage-applying apparatus 137 at regular time intervals, such that the direction of the electric field caused in the solvent separation unit 103 is reversed between the second electrodes 117. As a result, an electric field that attracts the negatively-charged solvent 114 present within the space (region) 142 toward the second electrode 117 (e.g., the right second electrode in FIG. 3B) that has been applied with the positive voltage is caused (see arrows 130). Thus, the negatively-charged solvent 114 present within the space (region) 142 is moved toward the second electrode 117 (e.g., the right second electrode 117 in FIG. 3B) that has been switched to the positive voltage, due to electrostatic attraction.

With regards to the above case, graphs (a) and (b), respectively, in FIG. 3C refer to voltages 123a and 123b that are applied to the respective second electrodes 117 from the second voltage-applying apparatus 137. Vertical axes and horizontal axes refer to voltages and time, respectively, in the graphs. A graph (c) in FIG. 3C refers to a voltage 123c that is applied to the first electrodes 116 present at both sides from the first voltage-applying apparatus 136. The vertical axis and the horizontal axis refer to voltages and time, respectively.

In the above-described manner, switching of the polarities of the voltages 123a and 123b to the second electrodes 117 is carried out using the second voltage-applying apparatus 137 at time intervals described below under control by the control unit 138, and thus, the solvent 114 flows to the downstream side of the solvent separation unit 103 while conducting an oscillating movement, i.e., moving alternately to different directions as shown by arrows 120 and 130, inside the solvent separation unit 103. Furthermore, the solvent 114 present in a space (region) 143 other than the space (region) 142 between the second electrodes 117 is also collected in the space (region) 142 between the second electrodes 117 inside the solvent separation unit 103, while conducting an oscillating movement by influences from the solvent 114 present within the space (region) 142, and the collected solvent 114 flows toward the downstream side of the solvent separation unit 103.

Then, the second exhaust atmosphere 110, including the solvent 114 and having been collected between the pair of the second electrodes 117 in the solvent separation unit 103, is discharged from the solvent separation unit 103 through the second exhaust duct 105. Meanwhile, the first exhaust atmosphere 109, which does not include the solvent 114, is discharged from the solvent separation unit 103 through the first exhaust duct 104.

Figure 3D:
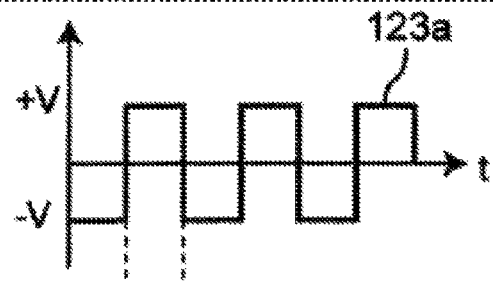
FIG. 3D shows graphs of voltages that are applied to first and second electrodes.
Figure 3D:
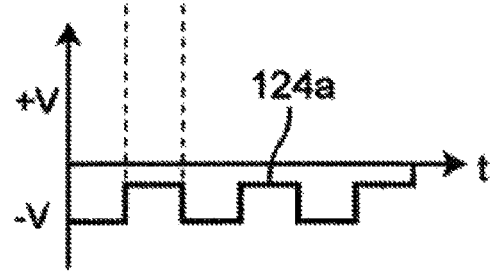
Figure 3D:
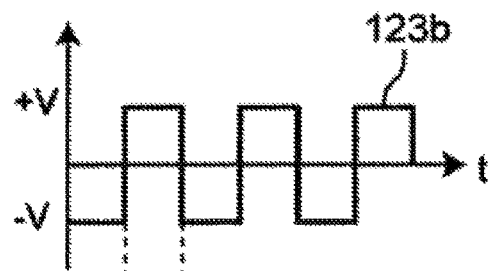
Figure 3D:
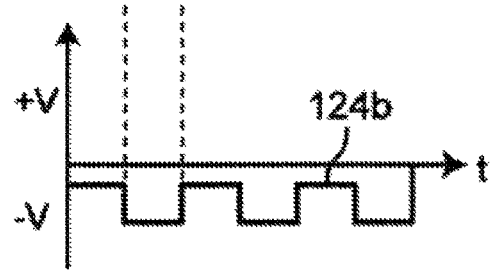

Furthermore, a graph (a) in FIG. 3D shows a voltage 123a that is applied to one of the second electrodes 117 from the second voltage-applying apparatus 137. A graph (b) in FIG. 3D shows a voltage 124a that is applied to the second electrode 117 present at the side where the second electrode 117 applied with the voltage 123a is present, from the first voltage-applying apparatus 136. A graph (c) in FIG. 3D shows a voltage 123b that is applied to the other second electrode 117 from the second voltage-applying apparatus 137. A graph (d) in FIG. 3D shows a voltage 124b that is applied to the other first electrode 116 present at the side where the other second electrode 117 applied with the voltage 123b is present, from the first voltage-applying apparatus 136. An absolute value of the voltage applied to each of the first electrodes 116 may be smaller than the voltage applied to the second electrodes 117 present at the same side only while the positive voltage is applied to the second electrode 117. However, the voltage of the each of the first electrodes 116 must not be positive although it can be 0 V.

In addition, when the solvent 114 is positively charged on the charging unit 102, the polarity of each of the electrodes in the above description is switched to the opposite polarity to thereby obtain the same effects.

Several parameters that relates to the solvent separation unit 103 will be described below.

It is assumed that a flow rate of an exhaust gas discharged from an exhaust gas-generating apparatus such as a heat treatment apparatus 1 is about 1 m/s to about 10 m/s. In order to direct a solvent 114 included in the exhaust gas with such a flow rate toward a space (region) 142 between the second electrodes 117, voltages applied to the first electrodes 116 and the second electrodes 117 are preferably set such that an electric field intensity between (i) the second electrode 117 that the voltage having the polarity opposite to polarity of the solvent 114 charged in the charging unit 102 is applied to and (ii) the first electrode 116 that is located at the side opposite to the side where the above second electrode 117 is present (i.e., the first electrode 116 of (ii) is not located at the side where the above second electrode 117 of (i) is present) is about 100 kV/m to about 500 kV/m. As one example and as a guide, it is considered that a suitable distance between the pair of the second electrodes 117 is about 15 mm to about 200 mm. It required that heights of wall surfaces of the tetragonal tubular member 115 of the solvent separation unit 103 in which the first electrodes 116 are provided is set to be substantially equal to or smaller than twice the distance between the pair of the second electrodes 117, in order to apply, to the solvent 114 present in the space (region) 143 other than the space (region) 142 between the second electrodes 117 inside the solvent separation unit 103, electric fields attracting the solvent 114 toward the second electrodes 117. As one example of the length of the flow channel of the solvent separation unit 103, it would be sufficient if the length is at least 10 cm or more, assuming that a flow rate of the fluid is about 1 m/s to about 10 m/s, in order to collect the solvent 114 in the space (region) 142 between the second electrodes 117 inside the solvent separation unit 103, thereby discharging therefrom. When frequencies of the voltages applied to the first electrodes lib and the second electrodes 117 are about 100 Hz to about 1 kHz with respect to the electric field intensities, then, an amplitude of the solvent 114 conducting an oscillating movement inside the solvent separation unit 103 would be about several hundred micrometers to about several millimeters. Since such an amplitude is sufficiently smaller relative to the width of the flow channel of the solvent separation unit 103, it becomes possible to prevent the solvent 114 from coming into contact with the electrodes 116 and 117, and also, it becomes possible to attract the solvent 114 toward the second electrodes 11. When heights of the second electrodes 117 is substantially equal to or smaller than half of the height of wall surfaces of the solvent separation unit 103 in which the first electrodes 116 are provided, it becomes possible to collect the solvent 114 in a space (region) that occupies a lower half part of the solvent separation unit 103 when viewed as the cross-section of the solvent separation unit 103 shown in FIG. 3B, and thus, the collected solvent 114 can be discharged from the solvent separation, unit 103 as a portion of the exhaust atmosphere. Additionally, as long as heights of the second electrodes 117 are at least 5 mm or more, the solvent 114 can be attracted toward the second electrodes 117.

A distance between the first electrode 116 and the second electrode 117 at each side may be adjusted such that an electric field intensity applied to a space between the first electrode 116 and the second electrode 117 is approximately equal to or less than half of $2.0 \times 10^6$ v/m, which is the dielectric strength of the air.

According to the solvent separation method and the solvent separation apparatus according to the first embodiment, a unidirectional electric field is not applied to the first electrodes 116 and the second electrodes 117, but electric fields 120 and 130 that make it possible for the solvent 114 to move toward the second electrodes 117 are alternately applied to the first electrodes 116 and the second electrodes 117. Accordingly, the solvent 114 is oscillated, and the voltages or frequencies are set so that an amplitude of the oscillated solvent 114 becomes smaller relative to a width of the flow channel, and thus, it becomes possible to efficiently separate from the exhaust atmosphere a gas including the solvent 114 while preventing the solvent 114 from coming into contact with the second electrodes 117.

Second Embodiment

Figure 4:
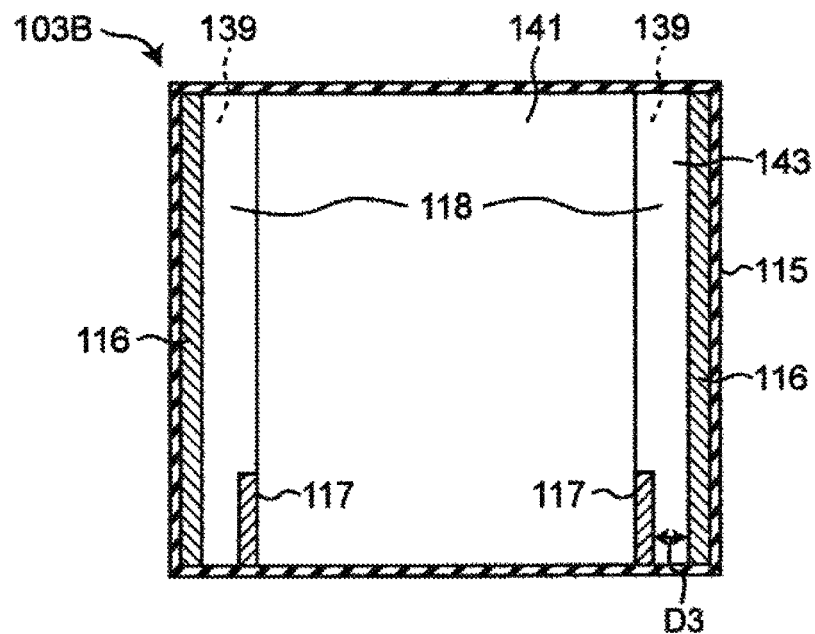
FIG. 4 is a diagram that shows a structure of a solvent separation unit in a second embodiment of the disclosure.

FIG. 4 is a diagram that shows a structure of the solvent separation unit according to a second embodiment of the disclosure. The solvent separation unit 103B according to the second embodiment has a structure in which isolation members 118 that isolate respective spaces (regions) 139 between the respective first electrodes 116 and the respective second electrodes 117 from a space (region) 141 having the same width as the width of the space between the pair of the second electrodes 117 are provided, instead of the structure of the solvent separation unit 103 according to the first embodiment, such that the solvent 114 does not pass through each space 139 between the first electrode 116 and the second electrode 117 at each side.

Since the spaces (regions) 139 present at both sides are isolated completely from the space (region) 141 by the isolation members 118 in the solvent separation unit 103B, the exhaust atmosphere 108 cannot pass through the spaces (regions) 139. Accordingly, it becomes possible to prevent a situation in which a part of the solvent 114 included in the exhaust atmosphere 106 that has flowed into the solvent separation unit 103B penetrates into the spaces (regions) 139, and is trapped therein, and thus, the trapped solvent 114 cannot be discharged from the solvent separation unit 103B.

In the second embodiment, besides effects obtained in the first embodiment, the solvent 114 included in the exhaust atmosphere 108 that has been introduced into the solvent separation unit 103B can reliably be discharged from the solvent separation unit 103B since the solvent 114 does not penetrate into the spaces 139 between the respective first and second electrodes 116 and 117 at the both side.

For the isolation members 118, tabular materials having a dielectric strength sufficient not to cause short circuits are suitable in consideration of voltages applied to the electrodes 116 and 117, distances D3 between the respective first and second electrodes 116 and 117 at the both side. For example, given that the same conditions as in the first embodiment are adopted, a tabular material made of polytetrafluoroethylene (dielectric strength: $-2 \times 10^7$ V/m) can be mentioned. In addition, since the dielectric strength of the air is substantially large, only the sides of the isolation members 118 located in the vicinity of the inlet 121 may be shielded, and the rest of the inner parts of the isolation members 118 may be hollow.

Third Embodiment

Figure 5:
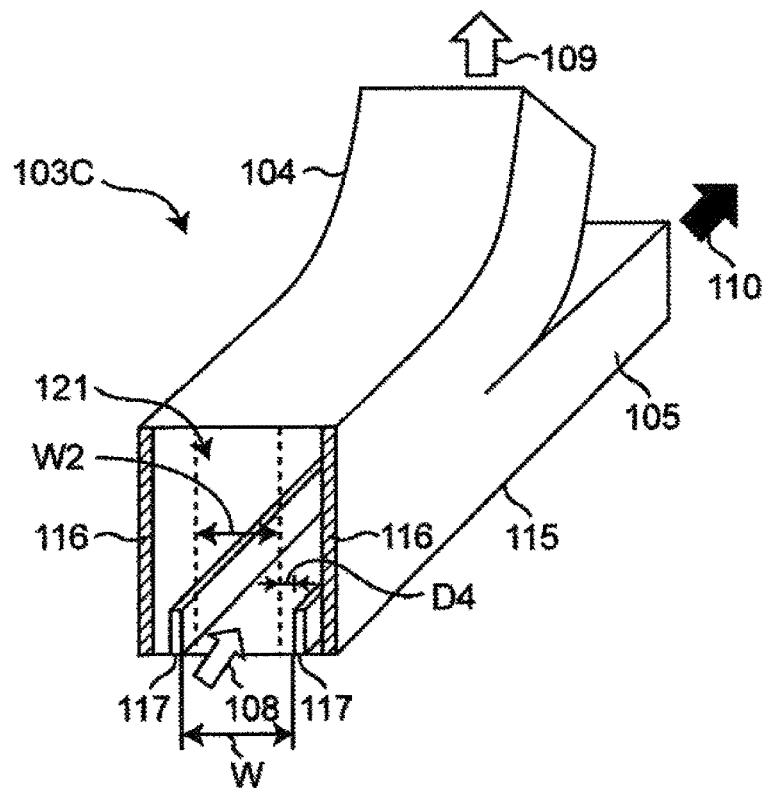
FIG. 5 is a diagram that shows a structure of a solvent separation unit in a third embodiment of the disclosure.

FIG. 5 is a diagram that shows a structure of a solvent separation unit according to a third embodiment of the disclosure. In the third embodiment, instead of the solvent separation unit 103 in the first embodiment, provided is a solvent separation unit 103C having a structure in which a flow channel width W2 of an inlet 121 is arranged to be smaller than a width W between the pair of second electrodes 117. In the first embodiment, when the solvent 114 flows into the inlet 121 of the solvent separation unit 103C, the solvent 114 that is present around the rim of the inlet 121 and in the vicinity of the second electrodes 117 possibly comes into contact with the second electrodes 117 even if an amplitude of the oscillating movement of the solvent is very small, since there is almost no distance between the solvent 114 and each of the second electrodes 117. Hence, by arranging the flow channel width W2 of the inlet 121 to be smaller than the width W between the second electrodes 117, it becomes possible to discharge the solvent 114 from the solvent separation unit 103C while preventing the solvent 114 that penetrates into the inlet 121 in the vicinity of the second electrodes 117 from coming into contact with the second electrodes 117.

In the third embodiment, besides the effects obtained in the first embodiment, it becomes possible to further reliably prevent the solvent 114 from coming into contact with the second electrodes 117 since the solvent 114 passes through a region that is sufficiently remote from the second electrodes 117 in the solvent separation unit 103C. Furthermore, it is considered that it would be sufficient if a distance D4 between the inlet 121 and the second electrodes 117 in the solvent separation unit 103C is 5 mm or more, in consideration of variations in the electric fields and the like, since the amplitude of the oscillating movement of the solvent 114 is about several hundred micrometers to about several millimeters, and would be about 3 mm at the highest estimate. Additionally, considering that an exhaust gas-generating apparatus such as a heat treatment apparatus 1 is connected to the solvent separation unit 103C, it is considered that the width W2 of the inlet 121 needs to be at least 5 mm or more, in order to keep the flow rate down to about m/s 1 to about 10 m/s.

Fourth Embodiment

Figure 6A:
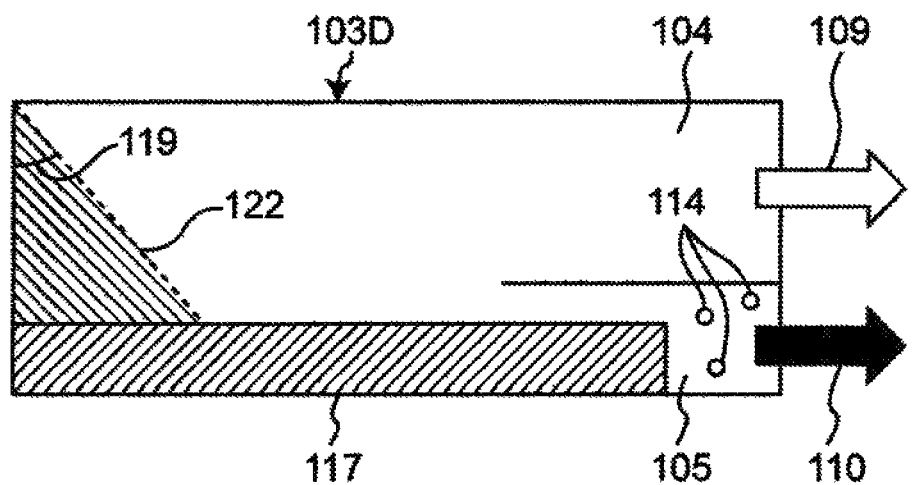
FIG. 6A is a diagram that shows a structure of a solvent separation unit in a fourth embodiment of the disclosure.
Figure 6B:
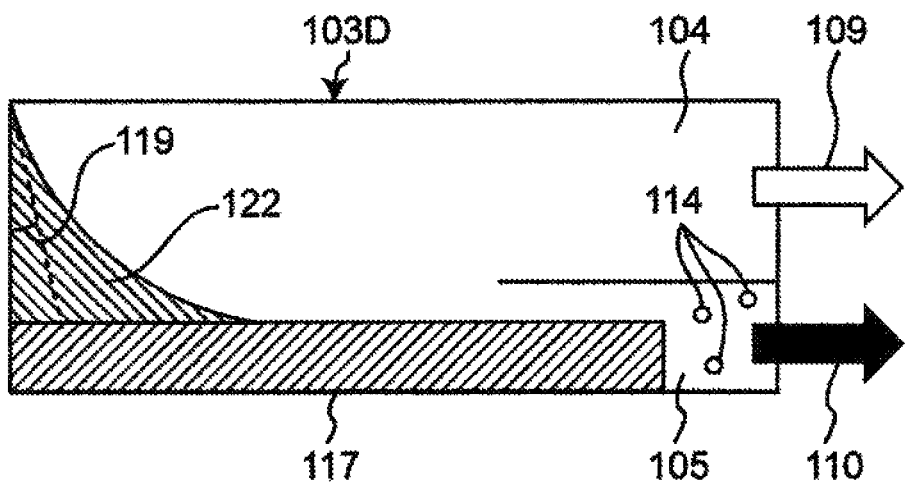
FIG. 6B is a diagram that shows a structure of a solvent separation unit in the fourth embodiment of the disclosure.
Figure 6C:
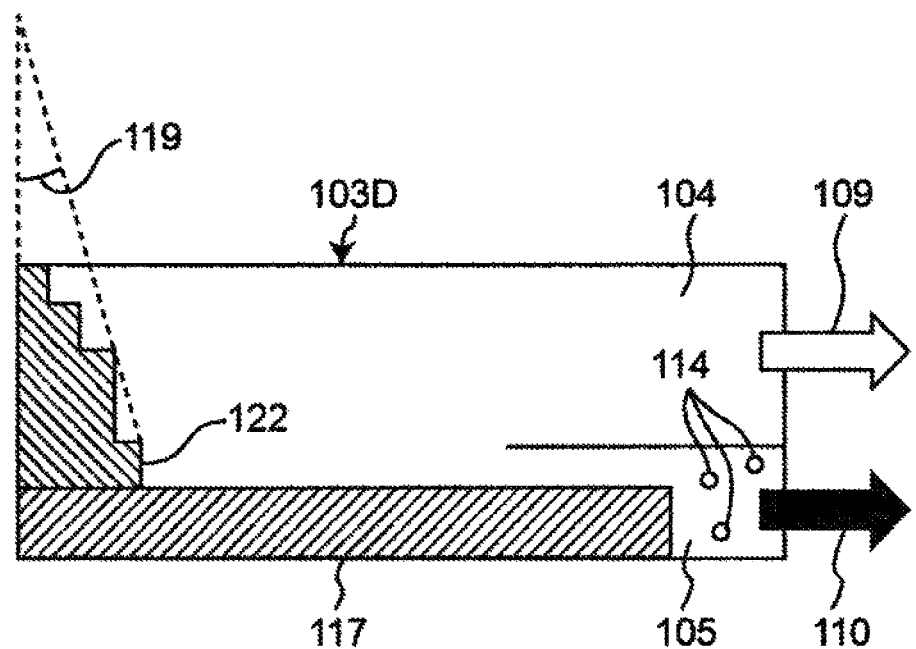
FIG. 6C is a diagram that shows a structure of a solvent separation unit in the fourth embodiment of the disclosure.

FIGS. 6A to 6C are diagrams that show structures of solvent separation units according to the fourth embodiment.

In each of the figures, a second electrode 117 and a third electrode 122 are distinguished from other members by hatching to facilitate understanding of the described structure. In the fourth embodiment, instead of the structure of the solvent separation unit 103 in the first embodiment, a pair of third electrodes 122 having the same thickness as the second electrodes 117 are placed on the second electrodes 117 parallel to inner wall surfaces of a solvent separation unit 103D and within the same planes where the second electrodes 117 are present, so as to come into contact with the second electrodes 117. Heights of the third electrodes 122 each gradually become larger toward the direction from the downstream to the upstream of the solvent separation unit 103D, and upstream-downstream lengths of cross-sections of the third electrodes 122 (cross-sections thereof parallel to the surfaces of the third electrodes 122 coming into contact with the respective second electrodes 117) each gradually become smaller with increasing distances from the respective electrodes 117.

Additionally, an electric potential of each of the third electrodes 122 at both sides is set to the same potential as that of the second electrode 117 present at the same side.

In the fourth embodiment, since the third electrodes 122 are also located close to the solvent 114 that flows through a space (region) (e.g., spaces 139 in FIG. 4) other than a space region (e.g., the space 141 in FIG. 4) between the pair of the second electrodes 117 inside the solvent separation unit 103D, not only the effects obtained in the first embodiment can be realized, but also the solvent 114 can be attracted toward the space (region) between the second electrodes 117. Accordingly, it becomes possible to attract the solvent 114 toward the second electrodes 117 inside the solvent separation unit 103D even if heights of the wall surfaces of the solvent separation unit 103D where the first electrodes 116 are provided are arranged to be larger than twice the distance between the pair of second electrodes 117.

In cases where the third electrodes 122 are triangular and tabular as shown in FIG. 6A, it would be sufficient if an angle 119 between each of the third electrodes 122 and an opening plane of the inlet 121 is 10° or more, and the third electrodes 122 do not extend into the first exhaust duct 105 at the branching point of the first exhaust duct 104 and the second exhaust duct 105.

Furthermore, in a case in which the upper surface of each of the third electrodes 122 is curved so as to form a curved and concave portion as shown in FIG. 6B, it would be sufficient if an angle 119 between a tangent line to the curve and an opening plane of the inlet 121 is 10° or more, given that the tangent line is one that forms the sharpest angle 119.

In a case where the upper surface of each of the third electrodes 122 is arranged in a staircase pattern in a direction from the upstream to the downstream as shown in FIG. 6C, it would be sufficient if an angle 119 between i) a line joining coiners of a certain step and a step next to the certain step and ii) an opening plane of the inlet 121 is 10° or more, given that the line is one that forms the sharpest angle 119.

Heights of wall surfaces of the solvent separation unit 103D where the first electrodes 116 are provided can be varied within a range satisfying the above conditions for the third electrodes 122. In addition, the respective second electrodes 117 and the respective third electrodes 122 are formed as single bodies.

Fifth Embodiment

Figure 7:
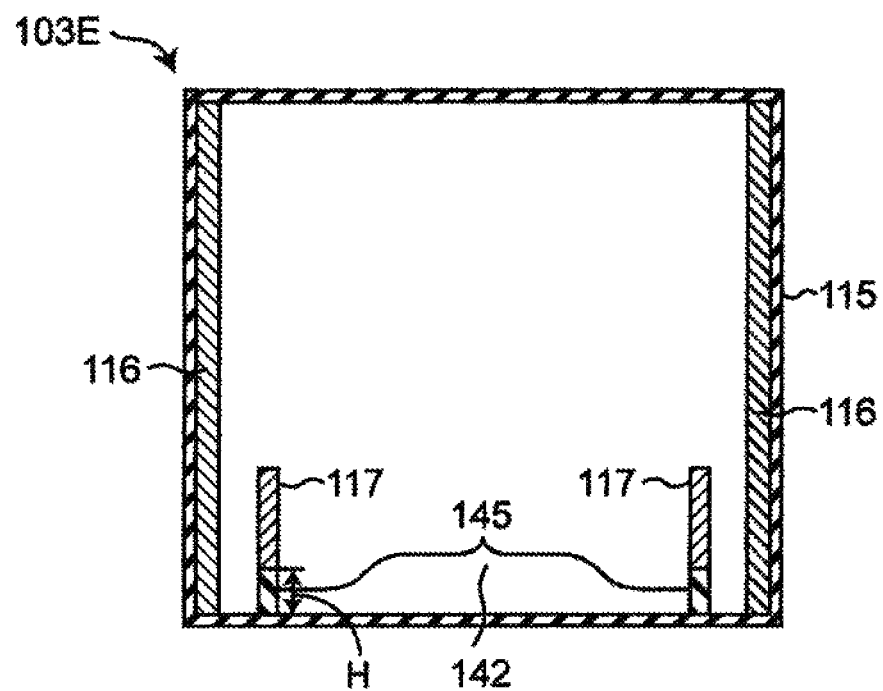
FIG. 7 is a diagram that shows a structure of a solvent separation unit in a fifth embodiment of the disclosure.
Figure 8:
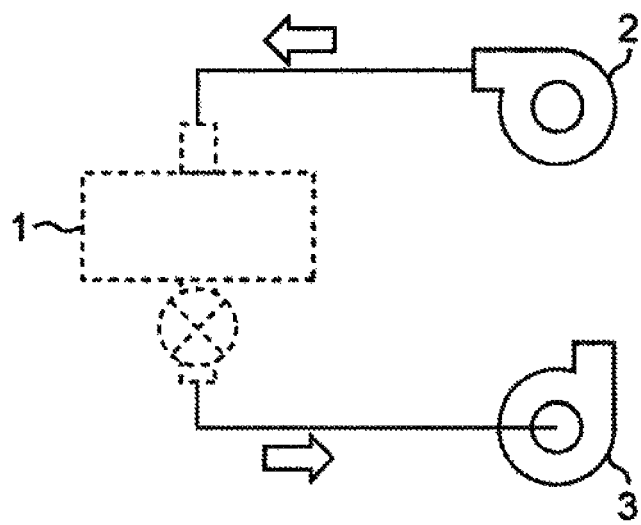
FIG. 8 is a schematic configuration diagram that depicts supply and discharge of an atmosphere according to related arts.
Figure 9:
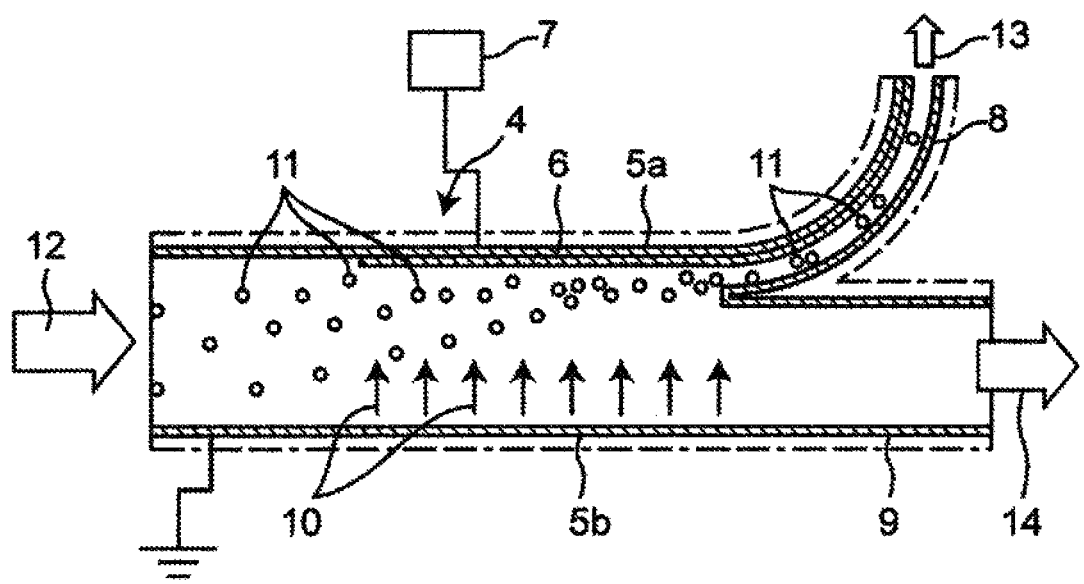
FIG. 9 is a schematic diagram that shows a structure of a conventional solvent separation apparatus.

FIG. 7 is a diagram that shows a structure of a solvent separation unit according to the fifth embodiment. In the fifth embodiment, instead of the solvent separation unit 103 in the first embodiment, provided is a solvent separation unit 103E having a structure in which second electrodes 117 are located above a bottom wall surface of a tetragonal tubular member 115 in the solvent separation unit 103E. Insulation members 145 that adjust heights of the respective second electrodes 117 are inserted between the respective second electrodes 117 and the wall surface of the tetragonal tubular member 115 of the solvent separation unit 103E.

In the fifth embodiment, not only the effects obtained according to the first embodiment will be realized, but also the solvent 114 that has been collected in the vicinity of the wall surface of the tetragonal tubular member 115 in a space (region) 142 between the pair of the second electrodes 117 can be prevented from coming into contact with the wall surface of the tetragonal tubular member 115 in the solvent separation unit 103E.

As long as a height H from the bottom wall surface of tetragonal tubular member 115 to the bottom surface of each of the second electrodes 117 is 5 mm or more, sufficient effects would be obtained.

In addition, any of the above various embodiments/variation examples can be combined to realize respective effects brought about by them. Furthermore, combination of embodiments, combination of examples, and combination of embodiments and examples are possible, and also, combination of features in different embodiments and/or examples is possible.

The solvent separation method and the solvent separation apparatus according to the disclosure makes it possible to efficiently separate a solvent included in an exhaust atmosphere while preventing the solvent from coming into contact with electrodes included therein. Therefore, the solvent separation method and the solvent separation apparatus only require less frequent maintenance and a smaller amount of an atmosphere, and thus, can be applied to any exhaust gas-generating apparatuses (e.g. drying furnaces, baking furnaces cure furnaces, and reflow furnaces) that are utilized in processes of production of various industrial products and various electronic components.

What is claimed is:

1. A method for separating a vaporized solvent from a gas in a solvent separation apparatus, the solvent separation apparatus comprising (i) a tetragonal tubular casing, (ii) a pair of first electrodes that are insulated from the casing and that are placed to cover surfaces entirely of a pair of opposing inner walls inside the casing, and (iii) a pair of second electrodes that are insulated from the casing and the first electrodes, that are placed inside the casing parallel to the first electrodes and displaced inward from the first electrodes, and that each have a height substantially equal to or smaller than half a height of the surfaces of the inner walls, wherein the first electrodes and the second electrodes are placed at locations ensuring that a first distance from each of the second electrodes to the first electrode, closest to said each of the second electrodes, is smaller than a distance from said each of the second electrodes to a centerline of the casing, and that the first electrodes and the second electrodes, respectively, are symmetrical to one another about the centerline, the method comprising:
    (a) charging the vaporized solvent included in the gas prior to causing the gas to flow into the casing;
    (b) applying to one of the second electrodes a first voltage having a first polarity opposite to a second polarity of the vaporized solvent, and applying to the first electrodes and the other second electrode a second voltage having the second polarity same as the vaporized solvent;

(c) switching the polarities of the voltages applied to the second electrodes at regular time intervals to collect the vaporized solvent in a predetermined region inside the casing; and (d) separating a first gas, substantially including the vaporized solvent, collected from a second gas, not substantially including the vaporized solvent, present in a region other than the predetermined region inside the casing, and discharging the first and second gases from the casing.

2. An apparatus for separating a vaporized solvent from a gas including, the apparatus comprising:

(i) a tetragonal tubular casing;

(ii) a pair of first electrodes that are insulated from the casing and that are placed to cover surfaces entirely of a pair of opposing inner walls inside the casing;

(iii) a pair of second electrodes that are insulated from the casing and the first electrodes, that are placed inside the casing parallel to the first electrodes and displaced inward from the first electrodes, and that each have a height substantially equal to or smaller than half a height of the surfaces of the inner walls;

(iv) an inlet that has a width substantially equal to or smaller than a width of a space between the second electrodes;

(v) a charging unit that is provided in a flow channel through which the gas is caused to flow into the casing;

(vi) a first exhaust gas flow channel and a second exhaust gas flow channel, wherein the first exhaust gas flow channel and the second exhaust gas flow channel are provided downstream of the casing, and are branched from the casing in a direction vertical to a space between the first electrodes;

(vii) a voltage-applying apparatus that applies to one of the second electrodes a voltage having a polarity opposite to the polarity of the vaporized solvent, and applies to the first electrodes and the other second electrode a voltage having the same polarity as the polarity of the vaporized solvent; and (viii) a control unit that controls the voltage-applying apparatus to switch the polarities of the voltages applied to the second electrodes at regular time intervals, wherein the first electrodes and the second electrodes are placed at positions ensuring that a first distance from each of the second electrodes to the first electrode, closest to said each of the second electrodes, is smaller than a second distance from said each of the second electrodes to a centerline of the casing, and that the first electrodes and the second electrodes, respectively, are symmetrical to one another about the centerline, and the second electrodes each extend into the second exhaust gas flow channel.

3. The apparatus according to claim 2, further comprising a pair of third electrodes that each have substantially a same thicknesses as thicknesses of the second electrodes, and that are placed within planes on which the second electrodes are provided to come into contact with the second electrodes, wherein heights of the third electrodes in the planes each gradually become larger toward a direction from an outlet side to an inlet side of the casing, lengths of cross sections of the third electrodes each gradually become smaller with increasing distances from the second electrodes, the cross sections of the third electrodes are parallel to surfaces of the third electrodes that are in contact with the second electrodes, and the third electrodes do not extend into a first gas channel at the branching point of the first gas channel and a second gas channel.

* * * * *